United States Patent Office 2,773,740
Patented Dec. 11, 1956

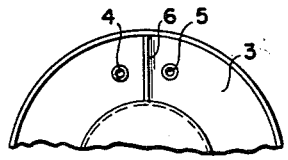
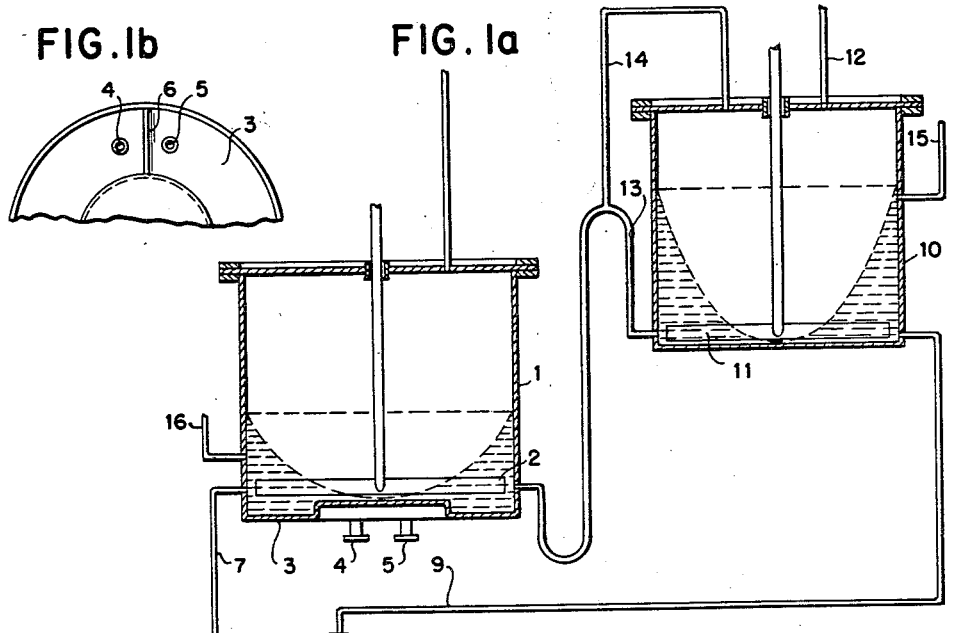
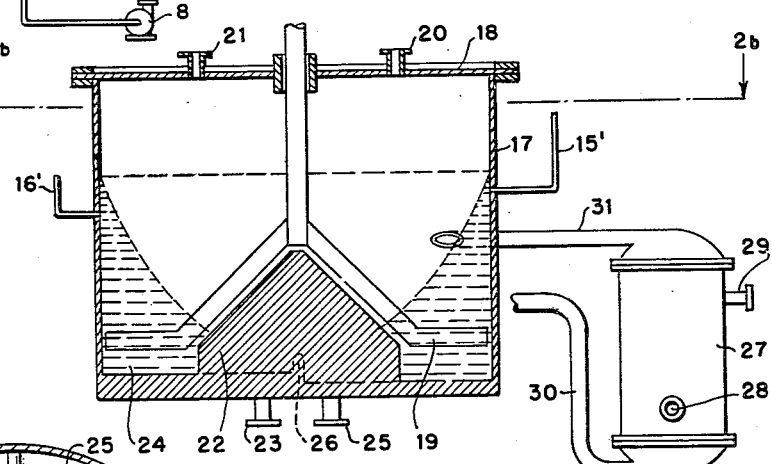
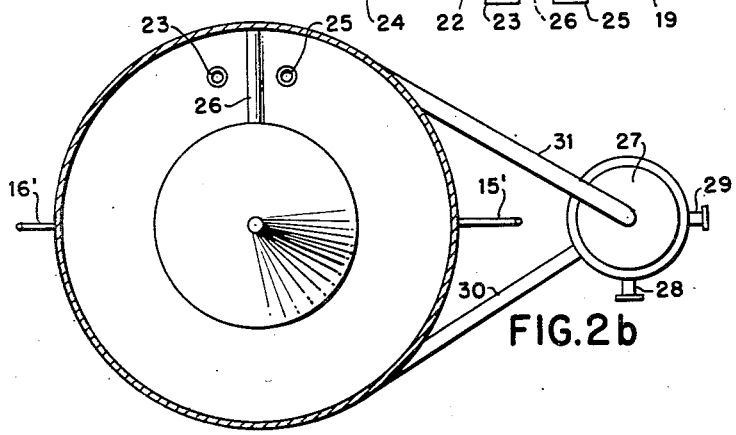

2,773,740

PROCESS AND APPARATUS FOR THE CONTINUOUS PRODUCTION OF AQUEOUS SOLUTIONS OF SODIUM HYDROSULFITE FROM SODIUM AMALGAM AND GASEOUS SO₂

Arnoldo Battarra, deceased, late of Milan, Italy, by Marie Elisa Battarra, heir and guardian of heirs, Alberto Battarra, heir, Dino Maveri, Alfonso Melloni, and Luigi Frigeri, all of Milan, Italy, assignors to Montecatini, Societa Generale per l'Industria Mineraria e Chimica, a corporation of Italy Application March 19, 1953, Serial No. 343,334

Claims priority, application Italy March 21, 1952

7 Claims. (Cl. 23—116)

The present invention relates to the production of sodium hydrosulfite in aqueous solution, from sodium amalgam and gaseous $SO_2$ in the presence of an aqueous solution of sodium bisulfite and sulfite or buffer solution according to the following equations:

$$2Na_2SO_3 + 2H_2O + 2SO_2 + 4NaHSO_3$$
$$\underline{4NaHSO_3 + 2Na = Na_2S_2O_4 + 2NaSO_3 + 2H_2O}$$
$$2Na + 2SO_2 = Na_2S_2O_4$$

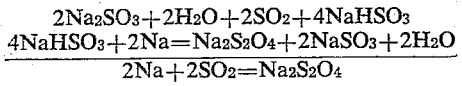

The direct reaction between sodium and $SO_2$ offers no industrial interest because operation has to be carried out under conditions, which yield a hydrosulfite that is too much polluted with products of decomposition so that it cannot be utilized in practice; but also the use of an aqueous solution of sulfite and bisulfite acting as a vehicle—owing to the intervention of numerous parasitic secondary reactions (about twenty are possible) complicating the problem—involves difficulties which have so far hindered the industrial utilization of that play of reactions so simple in appearance and verified in the laboratory.

The technological requirements (due also to the properties of sodium hydrosulfite) which as is known must all be met in order that a process based on the reactions written above may be practicable, are the following:

(1) The time of stay of the hydrosulfite in the reactor has to be as short as possible, to prevent its decomposition (formation of thiosulfates, etc.);

(2) The hydrosulfite solution obtained has to be as concentrated as possible in order that the so called saltingout may be feasible, that is the separation by means of an addition of sodium chloride, which is successful with industrially acceptable yields only under determined conditions of concentration;

(3) The hydrosulfite obtained has to be as pure as possible in particular the less possible polluted with sulfite, because subsequent separation of the latter is impossible in practice.

From both the point of view of apparatus equipment (there are not known any proposals other than the generic proposal of stirring in a cooled reactor containing the vehicle-buffer solution over the amalgam fed and taken off from bottom, while the gaseous $SO_2$ is fed from top) and the point of view of process (the most recent patents propose for example the addition of other neutral and slightly acid alkali salts to the solution, temperatures of from 10 to 14° C., pH from 6 to 7); it can be said that the search for operating conditions such as to attain high yields and, at the same time, high concentrations, has not succeeded up till now in providing a result translatable into industrial scale.

Now it is an object of the present invention to provide a combination of process and apparatus characteristics representing an improvement of operating conditions enabling to utilize eventually the laboratory reactions on industrial scale.

It has been found in fact that one of the essential conditions for eliminating the inconveniences encountered heretofore, is an intensive particular circulation of the buffer solution so that it brings the latter into rapid alternating contact with the reagents, $SO_2$ and sodium amalgam.

So far, the importance of circulating the solution between the surfaces of contact between $SO_2$ and the amalgam respectively had not been recognized. In the known proposals, the effect is not even considered; and other features of process and apparatus of the present invention are lacking therein as well.

Still according to the present invention, the process may be carried out with two reactors in which separately the solution reacts with $SO_2$ and with sodium amalgam respectively, as well as with one single apparatus having suitable characteristics. In the case of the variant with two distinct reactors, an intensive circulation has to be ensured also therebetween.

Still according to the present invention the other conditions under which these reactions have to be carried out to attain the desired result, are:

(1) Temperature from 10 to 25° C., preferably higher than 15° C.;
(2) pH kept in the limits between 5.4 and 5.8;
(3) Contact between the solution and $SO_2$ on a surface of frustum of paraboloid of rotation in rapid movement and having such surface area that its ratio to the surface area of the liquid if at rest is at least 1.2:1;
(4) Exclusion of the central zone of the paraboloid, corresponding to its vertex, obtained by means of a convenient projection on the bottom of the reactor;
(5) Sodium amalgam:
 (a) In thin film (from about 2 to 5 mm.);
 (b) Circulating by gravity in an inclined peripheral channel;
 (c) Taken off not completely exhausted (sodium concentration about 0.001 to 0.002% by weight against about 0.01 to 0.05 at the inlet);
 (d) Not stirred.

The taking off of the final solution is effected preferably from the top of the reactor containing the amalgam, or of the single reactor respectively.

As for the concentration of the buffer-vehicle solution, it may be selected in accordance with the type of product solution that has to be obtained (concentrated for saltingout or diluted for particular uses) the difficulties encountered heretofore on industrial scale being avoided with the process of the invention. So, for example, if operation is carried out under the conditions specified hereinbefore, starting from buffer-solutions of sodium sulfite and bisulfite with $SO_2$-concentrations up to 70 g./l. and introducing $SO_2$ in stoichiometric proportion in respect to the sodium fed in the form of an amalgam, it is possible to obtain hydrosulfite solutions at the limit of solubility, capable of giving a finished solid product with an $Na_2S_2O_4$ content higher than 85%, with overall yields between 50 and 65%.

Analogously starting from buffer solutions containing at least 15 g./l. of $SO_2$ and still under the specified conditions, it is possible to obtain with yields of 70–80% hydrosulfite solutions with at least 40 g./l. suitable as they are for bleaching.

The invention with these and other features will be more clearly explained hereinafter with reference to the accompanying drawings wherein:

Fig. 1a is a schematic view of one embodiment, showing in cross section a two-reactor device for carrying out the herein-claimed invention;

Fig. 1b is a partial top view of reactor 1 in Fig. 1a; with the lid of the reactor removed;

Fig. 2a is a schematic view of another embodiment, showing in cross section a one-reactor device for carrying out the present invention; and Fig. 2b is a sectional view on the line 2b—2b of Fig. 2a, with the stirrer 19 removed.

With reference to Figures 1a and 1b, 1 is the apparatus in which the reaction between the solution and the amalgam takes place. Within the apparatus there is the stirrer 2 which renewing the solution in the contact zone accelerates the reaction between the amalgam and the solution. The amalgamated mercury flows by gravity within the apparatus through a circular channel 3, into which it is fed through the inlet 4 and which it leaves through the outlet 5, while a baffle 6, see Fig. 1b, has the task of preventing the amalgam from passing directly from the feed 4 to the discharge 5 without flowing through the channel 3. The solution contained in the apparatus 1 is sucked through the piping 7 by the pump 8 and is sent through the piping 9 to the cooling coil (not shown in the drawing).

The cooled solution then enters the apparatus 10 equipped with a powerful stirrer 11, which imparts to the surface of contact between the liquid and gaseous phases the shape of a frustum of rotation paraboloid. It is in this apparatus 10 that the solution comes to contact the $SO_2$ in gaseous phase, introduced by way of the piping 12.

The solution that has absorbed the $SO_2$ leaves the apparatus 10 through a syphon pipe 13 operated by overflow (with a connecting piping 14 to avoid priming of the syphon). The solution returns by gravity to the apparatus 1. Also in the apparatus 1 it is advantageous to have such agitation as to give the liquid a surface of frustum of paraboloid.

The feed, constituted by a solution of sodium sulfite and bisulfite, is introduced into the apparatus 10 from 15, with a hydraulic valve (not shown).

The taking off of the product solution may be obtained in a continuous manner from the apparatus 1 through the overflow piping 16. The apparatuses 1 and 10 are run in continuous cycle.

In Figures 2a and 2b there is represented an improved embodiment of apparatus permitting to practice the conditions of circulation according to the invention in one single reactor.

With reference to Figures 2a and 2b, the apparatus 17 is constituted by a cylindrical vessel having a flat bottom and closed at top by a cover 18 through which passes the shaft of the stirrer 19 and on which there are applied the inlet 20 for feeding $SO_2$ in the gaseous state, and the outlet 21 venting to the atmosphere through an ordinary hydraulic valve not represented in the drawing; on the bottom there is applied a profile 22 with a circular step and a peak at the centre. On the circular step channel flows the amalgam; this step is inclined in such a manner that the amalgam acts as a thin film of from 2 to 5 mm. In fact, the amalgam enters from the inlet 23 into the inclined channel 24 and passes to the outlet 25, which is separated from the inlet 23 by means of a baffle 26.

The profile 22 has a peak at its centre which rises above the channel by an amount ensuring that during operation, viz. during formation of the already described frusto-paraboloid surface, there remains no liquid at the centre where stirring is less effective.

The stirrer 19 is constituted by blades shaped in such a manner as to follow in part the profile but so as to exclude contact with the amalgam. The sense of rotation of the stirrer is concurrent with the sense of flow of the amalgam.

The heat of reaction is subtracted, e. g. either by means of an external jacket (not shown in the drawing) in which circulates a cooling fluid, or with an exchanger 27 placed outside the apparatus, into which the cooling fluid enters at 28 and which it leaves at 29. The exchanger surface is dimensioned in such a way as to keep the temperature of the liquid in the reactor between about 10 and 25° C., preferably between 15 and 25° C.

The circulation of the solution in the cooler may be effected with a propeller or even without, merely utilizing the rotation of the very solution within the reactor, as caused by the stirrer. This is possible by arranging the outlet piping 30 and the return piping 31 tangential to the apparatus and as shown in the drawing. The apparatus is fed in a continuous manner with buffer solution by means of an inlet 15', while the hydrosulfite solution is removed continuously through an outlet 16'.

The corresponding $SO_2$ is fed in the gaseous phase through the inlet 20. Also this apparatus has the characteristic of operation in continuous cycle. The discharge of product is effected continuously through a conventional overflow and syphon not represented in the drawing.

In this apparatus an intensive circulation of the solution between the surfaces separating the various phases is obtained. As for the potentiality of the reactor, it is in relationship with the diameter of the latter; with a diameter of 500 mm., the apparatus can treat with satisfactory yields 2 to 3 kg./h.; with a diameter of 700 mm., up to 3–4 kg./h.; with a diameter of 1000 mm. up to 5–6 kg./h. of sodium.

These reactors are suitable for preparing hydrosulfite solutions having sufficient concentration (130–160 g./l. of $Na_2S_2O_4$) to permit preparation of solid sodium hydrosulfite (salting-out), as well as for preparing more diluted solutions (40–100 g./l. of $Na_2S_2O_4$) for direct use in paper-mill bleaching or other analogous applications, as already mentioned above.

It is important that the amalgam should be discharged before being completely exhausted.

Also in the case of Figures 1a and 1b, the reactors (1 and 10) may have conveniently bottoms and stirrers profiled like those of the reactor of Figures 2a and 2b.

In conclusion, the contrivances constituting the characteristics of the present invention provide operating conditions for the formation of hydrosulfite such as to balance the partly contrasting effects of the essential factors influencing this production; maximum reduction of impurity contents in the product; minimum decomposition of the hydrosulfite in the reactor; elevated concentrations of the product and, at the same time, elevated yields so as to permit practicing the process on industrial scale.

We claim:

1. The process of producing an aqueous solution of sodium hydrosulfite by reacting in an enclosed system an aqueous buffer solution of sodium sulfite and sodium bisulfite with sodium amalgam and gaseous $SO_2$, said process comprising rapidly circulating said buffer solution between contact surfaces of said sodium amalgam and said gaseous $SO_2$, whereby the contact surface between said buffer solution and said sodium amalgam constitutes an undisturbed circular peripheral ring and the contact surface between said buffer solution and said gaseous $SO_2$ constitutes a frustum of a rotation paraboloid.

2. The process of producing an aqueous solution of sodium hydrosulfite by reacting in an enclosed system an aqueous buffer solution of sodium sulfite and sodium bisulfite with sodium amalgam and gaseous $SO_2$, said process comprising rapidly circulating said buffer solution between contact surfaces of said sodium amalgam and said gaseous $SO_2$, whereby the contact surface between said buffer solution and said sodium amalgam constitutes an undisturbed circular peripheral ring and the contact surface between said buffer solution and said gaseous $SO_2$ constitutes a frustum of a rotation paraboloid that has a surface area at least 1.2 times as large as the surface area of the buffer solution at rest.

3. The process of producing an aqueous solution of sodium hydrosulfite by reacting an aqueous buffer solution of sodium sulfite and sodium bisulfite with sodium amalgam in one part of an enclosed system, transferring said solution to another part of the enclosed system and reacting it there with gaseous $SO_2$, said process comprising rapidly circulating said buffer solution between contact surfaces of said sodium amalgam and said gaseous $SO_2$, whereby the contact surface between said buffer solution and said sodium amalgam constitutes an undisturbed circular peripheral ring and the contact surface between said buffer solution and said gaseous $SO_2$ constitutes a frustum of a rotation paraboloid.

4. In a process which comprises reacting an aqueous buffer solution of sodium sulfite and bisulfite with sodium amalgam and with gaseous $SO_2$ on distinct and separate contact surfaces, the step of circulating sodium amalgam in an undisturbed thin annular film of from about 2 to about 5 mm. thickness in contact with sodium sulfite and bisulfite solution, said amalgam being continuously fed with a sodium concentration of from about 0.01 to 0.05% by weight and discharged before being completely exhausted, with a sodium concentration of from about 0.001 to about 0.002% by weight.

5. The process of producing an aqueous solution of sodium hydrosulfite which comprises reacting an aqueous buffer solution of sodium sulfite and bisulfite with sodium amalgam and gaseous $SO_2$ on distinct and separate contact surfaces in rapid relative movement, the contact surface between said solution and said sodium amalgam being that of a circular peripheral ring and the contact surface between said solution and said gaseous $SO_2$ being that of a frustum of a rotation paraboloid, whereby said solution is intensively circulated between said two contact surfaces, the pH of the medium is maintained between about 5.4 and 5.8 and the temperature between about 10 and 25° C., preferably above 15° C., and the gaseous $SO_2$ being fed in substantially stoichiometric proportion in respect to sodium.

6. A reactor for producing sodium hydrosulfite by reacting a fluid constituent consisting of a buffer solution of sodium sulfite and bisulfite with gaseous $SO_2$ and with sodium amalgam on distinct contact surfaces while rapidly circulating said fluid constituent between said surfaces, said reactor comprising a cylindrical, enclosed vessel provided with a raised, central bottom portion of substantially conical shape, surrounded by a peripheral annular channel, inlet and outlet openings at the bottom of said channel adjacent to each other and separated by a baffle within the channel, a stirrer comprising a shaft and stirrer arms sloped to rotate parallel to, and in close proximity with, the surface of said raised central bottom portion and extending horizontally over said peripheral annular channel at a height to clear said baffle, an inlet at the top for gaseous $SO_2$, a vent at the top, external cooling means for cooling the zone of the reactor containing said fluid constituent, and an outlet in the reactor wall for removing the fluid constituent.

7. A reactor for producing sodium hydrosulfite by reacting a fluid constituent consisting of a buffer solution of sodium sulfite and bisulfite with gaseous $SO_2$ and with sodium amalgam on distinct contact surfaces while rapidly circulating said fluid constituent between said surfaces, said reactor comprising a cylindrical, enclosed vessel provided with a raised central bottom portion of substantially conical shape, surrounded by a peripheral annular channel, inlet and outlet openings at the bottom of said channel adjacent to each other and separated by a baffle within the channel, a stirrer comprising a shaft and stirrer arms sloped to rotate parallel to, and in close proximity with, the surface of said raised central bottom portion and extending horizontally over said peripheral annular channel at a height to clear said baffle, an inlet at the top for gaseous $SO_2$, a vent at the top, external cooling means for cooling the zone of the reactor containing said fluid constituent, said cooling means comprising a separate heat exchanger and conduits arranged between said reactor and said heat exchanger to form a loop tangential to said reactor for circulating a portion of said fluid constituent between said reactor and said heat exchanger, and an outlet in the reactor wall for removing the fluid constituent.

References Cited in the file of this patent

UNITED STATES PATENTS

| | | |
|---|---|---|
| 1,477,130 | Kuhne | Dec. 11, 1923 |
| 1,609,773 | Riggs | Dec. 7, 1926 |
| 2,084,651 | Mecklenburg | June 22, 1937 |
| 2,204,476 | Dorph | June 11, 1940 |
| 2,576,769 | Avedekian | Nov. 27, 1951 |